United States Patent [19]

Rohner

[11] Patent Number: 5,680,325

[45] Date of Patent: Oct. 21, 1997

[54] NETWORK CAPACITY CREATION FOR VIDEO DIAL TONE NETWORK

[75] Inventor: Janet Rohner, Ellicott City, Md.

[73] Assignee: Bell Atlantic Network Services, Inc., Arlington, Va.

[21] Appl. No.: 518,861

[22] Filed: Aug. 24, 1995

[51] Int. Cl.⁶ ..................................... G06F 7/00
[52] U.S. Cl. .................. 364/514 C; 364/918.4; 364/918.9; 395/600; 395/201; 395/208; 395/210; 395/222
[58] Field of Search ............... 364/514 A, 514 B, 364/514 C, 514 R; 379/111, 114, 133; 395/600, 201, 208, 210, 222

[56] References Cited

U.S. PATENT DOCUMENTS

| | | |
|---|---|---|
| 4,949,187 | 8/1990 | Cohen . |
| 4,963,995 | 10/1990 | Lang . |
| 5,027,400 | 6/1991 | Baji et al. . |
| 5,057,932 | 10/1991 | Lang . |
| 5,130,792 | 7/1992 | Tindell et al. . |
| 5,132,992 | 7/1992 | Yurt et al. . |
| 5,133,079 | 7/1992 | Ballantyne et al. . |
| 5,247,347 | 9/1993 | Litteral et al. . |
| 5,253,275 | 10/1993 | Yurt et al. . |
| 5,274,643 | 12/1993 | Fisk ..................... 370/94.1 |
| 5,544,161 | 8/1996 | Bigham et al. ............... 370/58.1 |
| 5,555,444 | 9/1996 | Diekelman et al. ............ 455/12.1 |
| 5,561,841 | 10/1996 | Markus ..................... 455/33.1 |

OTHER PUBLICATIONS

Lee et al., "Strategic Planning and Considerations of Broadband Access Networks", IEEE Tencon 1993.

Joshi et al., "Planning For Broadband Services", Telecommunications v29n9, pp. 161–166 Sep. 1995.

Primary Examiner—Emanuel T. Voeltz
Assistant Examiner—Patrick J. Assouad
Attorney, Agent, or Firm—Lowe, Price, LeBlanc & Becker

[57] ABSTRACT

An arrangement for creating network transport capacity for a broadband network, such as a video dial tone network. The arrangement performs network capacity creation using capacity planning, capacity management, capacity implementation, and capacity activation. During capacity planning, a strategic plan for providing broadband transport services is established, and desired deployment regions are identified with the corresponding forecasted demands for service, to define a capacity budget which correlates the forecasted demand for service with forecasted network capacity and the desired deployment regions. Usage capacity of existing architecture is also monitored to determine whether existing network capacity has been or soon will be exhausted. A network model is developed for the desired deployment region in accordance with the capacity budget and the usage capacity for the selected network architecture. Capacity implementation determines changes necessary to the network, and orders and tracks the changes to the networks, and updates an inventory of existing network assets upon completion of the change orders. During capacity activation, the available assets in the network assets inventory are logically assigned and stored as assignable inventory representing available capacity for use in broadband data services.

22 Claims, 3 Drawing Sheets

NETWORK CAPACITY CREATION FOR VIDEO DIAL TONE NETWORK

TECHNICAL FIELD

The present invention relates to operational support systems and network creation methods utilizing such systems for generating and maintaining transport capacity on broadband communication networks, such as video dial tone networks.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

More recently, several different wideband digital distribution networks have been proposed for offering subscribers an array of video services, including true Video On Demand service. The following Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, U.S. Pat. No. 5,027,400 to Baji et al., and U.S. Pat. No. 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., the disclosure of which is hereby incorporated in its entirety into this disclosure by reference, discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complementary ADSL interface unit at the subscriber's premises separates downstream video control signals and voice telephone signals from the line and multiplexes upstream control signals and voice telephone signals onto the line.

Use of existing PSTN equipment for transmission of video data has the advantage of using the existing infrastructure of the telephone network to establish and support communication paths between the called and calling parties, in this case the VIP and the video information user (VIU) or subscriber.

The current state of the art of provisioning of residential services to customers of PSTNs, i.e., customer facilities, follows a series of steps not conceptually different from the steps that were followed in a manual provisioning environment some thirty years ago. The individual work steps have since been mechanized, and the mechanized steps have been connected with interfaces.

Broadband video service could be installed in the PSTN using the conventional service provisioning techniques known in the telephone art, particularly for an ADSL based network similar to that of Litteral et al. Specifically, techniques are known in the telephony art for network provisioning functions, including planning, engineering (specifying network elements and their configuration), and implementation in response to long-term and near-term planning activities. Examples of such provisioning techniques, including trunk provisioning, transmission facility and switching equipment provisioning, and operator-services provisioning, are discussed in detail in Chapter 13 of "Engineering and Operations in the Bell System", 1983, the disclosure of which is incorporated in its entirety by reference.

Thus, ADSL technology provides the advantage that existing copper plant is used to transmit video data, and equipment planning and deployment requirements to develop broadband transport capacity are relatively modest. However, alternative technologies have been proposed to provide improved broadband data transport services which require far more complex planning and deployment to develop desired broadband transport capacity. For example, network architectures that maximize the use of optical fiber have been proposed as a means to more efficiently transport broadband data. One proposal provides optical fiber transport of broadband data directly to a subscriber's home, so that the subscriber has a dedicated optical fiber for reception of broadband data. Alternatively, a hybrid-fiber coax architecture has been proposed that combines optical fiber transmission for distribution throughout the video dial tone network, with coaxial cable distribution to the customer premises. Particularly for a telephone operating company, development of desired new broadband capacity using these architectures would require complex planning of equipment purchases, physical installation, initial testing, activation of users, etc.

The proposed architectures of the broadband networks have relied on the assumption that video information providers and/or video subscribers are already on-line as having access on an installed video network. Such video network proposals have not addressed the manner in which actual capacity is developed, let alone how the video information providers or video subscribers are established as users of the video network. Further, such prior art video network disclosures do not address the procedure by which video information providers or video users are activated on the network based upon existing capacity and inventory. Finally, no procedure has been specifically proposed for broadband networks that effectively addresses the issue of creating an inventory of network assets that identifies the components of central office equipment and facilities equipment to be assigned for a desired broadband network transport capacity.

Existing telephony provisioning and service activation systems are not designed to provide the necessary network creation of assignable inventory for use in providing network transport capacity for a complex broadband network. For example, the proposed video network architectures inherently are based on transport of broadband data, such as video data. As a result, additional resources need to be allocated for existing PSTN systems to provide the additional bandwidth needed for large-scale video transport services, resulting in installation of optical fiber transport systems to supplement or replace existing copper systems. Existing telephony systems do not support design, deployment and allocation of these additional resources.

In addition, existing telephony provisioning and service activation systems are not designed to administer network resources meeting the transport requirements associated with a video network. For example, telephony architecture is designed to provide point-to-point, two-way communications between a calling party and a called party on low-bandwidth transmission lines. Capacity is measured on the basis of number of calls in a predetermined period of time compared with the average duration of the call, measured on the order of call-seconds. In addition, telephony architecture is essentially a random access-based system, whereby an individual calling party is able to contact any other individual subscriber on the telephone network.

The proposed video network architectures, however, contemplate point-to-multipoint services such as broadcast services or pay-per-view services, in combination with point-to-point broadband services such as IMTV. In the proposed video network architectures, subscribers are classified either as video information providers (VIPs) or video information users (VIUs), whereby substantially all communication in video network architectures will be between VIPs and VIUs (VIP-to-VIU and VIU-to-VIP), so that there is no need for communication paths between individual VIPs (VIP-to-VIP) or individual VIUs (VIU-to-VIU). Thus, unlike PSTN systems, video network architectures are designed to provide different transport services, whereby a single VIP may have one or two-way communication with a single VIU (IMTV), or with a plurality of users (broadcast or pay-per-view). Finally, since the video network is adapted to transport programming data such as movies, arts performances or sports events, typical broadband communications would be measured in call-hours, not call-seconds. Consequently, the transport capacity requirements are different for video network architectures than for telephony.

Thus, a network capacity creation system is needed to enable design and installation of equipment for new networks designed to provide various forms of transport of broadband communications, such as video dial tone. Such a network capacity creation system needs to provide sufficient flexibility to accommodate the design objectives of the various architectures for broadband communications.

DISCLOSURE OF THE INVENTION

It would be desirable to provide a system for establishing network transport capacity for a new broadband network, such as a video dial tone network. Such a system should be able to identify new geographic regions targeted for broadband service, identify and assign network assets for transport infrastructure, generate and track work orders for new equipment, and logically assign the network assets in order to provide an inventory of assignable assets that form the existing network transport capacity of the new broadband network.

It would also be desirable to provide a system for tracking existing network transport capacity against assigned inventory to determine if new equipment is necessary for additional network transport capacity in a broadband network.

It would also be desirable to provide a system that establishes an inventory of assignable assets for activation of video information providers and video information users on a video dial tone network.

In order to achieve these and other objects, the present invention provides a method and apparatus for creating network transport capacity for a broadband network. The broadband network may be a video dial tone network, and may use one or more of a plurality of local access technologies, including ADSL, wireless digital multiplexed broadcast, fiber-to-the-home, fiber-to-the-curb, or hybrid-fiber coax.

According to the present invention, the system for creating network transport capacity performs the functions of capacity planning, capacity management, capacity implementation, and capacity activation. Capacity planning includes establishing a strategic plan for providing broadband transport services, identifying geographic areas as desired deployment regions, forecasting demand for service in the desired deployment regions, and preparing a capacity budget that correlates forecasted demand for service with forecasted network capacity in the desired deployment regions. Capacity management includes the functions of comparing the capacity budget with any existing architecture capacity within the desired deployment regions, monitoring usage capacity of the existing architecture from current subscribers of the network, and developing a broadband network model for the desired deployment region to reconcile the capacity budget and the usage capacity with the existing architecture capacity within the desired deployment region.

Capacity implementation includes the functions of comparing the broadband network model with existing network assets to determine necessary changes to the network, ordering the changes to the network, tracking the change orders through actual execution thereof, and updating the inventory of existing network assets upon completion of the change orders. Capacity activation includes the functions of assigning the existing network assets to a logical network connection in accordance with the network model, installing and testing the logically-assigned network assets in accordance with the network model, and adding the installed network assets to the assignable inventory of the existing architecture capacity. The assignable inventory is then available for service creation and activation of network subscribers, including video information providers and video information users.

Thus, the present invention provides an arrangement (apparatus and method) that creates network transport capacity for a broadband network. The network transport capacity is recorded as assignable inventory available for use to activate service for a new video information provider or video information user. The present invention provides flexibility to accommodate different local access technologies, such as ADSL, wireless digital multiplexed broadcast, Hybrid-Fiber Coax, Fiber to the Curb, or Fiber to the Home.

These and other features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein.

BEST MODE FOR CARRYING OUT THE INVENTION

The system for creating network transport capacity according to the present invention is usable in a variety of different broadband distribution networks which offer subscriber's selective communication with a plurality of broadband or video information service providers. Although the preferred embodiment is directed to a system for providing network transport capacity for a video dial tone network, the present invention can be applied to different transport systems, including telephony.

As discussed in detail below, the system of the present invention is preferably implemented as part of an operational support system (OSS) of a video dial tone network. Thus, the OSS is responsible for all network creation and service activation, as well as management and tracking of all operational support services such as management of all service orders for new equipment or facilities, maintenance, and service. Additionally, the OSS may include a business office for accepting service requests from new or existing subscribers, including video information providers (VIPs) or video information users (VIUs).

Generally, network functionality can be conceptually divided into the following sections: network capacity creation functions, service creation functions, service activation functions, service control functions, service data functions, session management functions, connection management functions, element management functions, and actual element functions. As described in detail below, the service creation and service activation functions are performed by computer systems running in the OSS. The service control functions may be shared between application modules running in the OSS and a network manager, also referred to as a Level 1 Gateway. The service data functions, session management functions, and connection management functions all are performed by software application modules running on the Level 1 Gateway.

The OSS is responsible for functions related to network capacity creation, service creation, service activation, and service control within the network. The OSS maintains assignable inventory data that identifies network facilities and office equipment (OE) available for use and assignable to a service. The assignable inventory data is generated during the network creation process disclosed in FIG. 1 and represents inventory that is not assigned to a service and that is not under repair. In other words, the assignable inventory represents the available transport capacity of network equipment that is available for service but not in use. The OSS maintains the assignable inventory in order to activate available equipment for a new subscriber (VIP or VIU) that requests services from the network.

Figure 1:
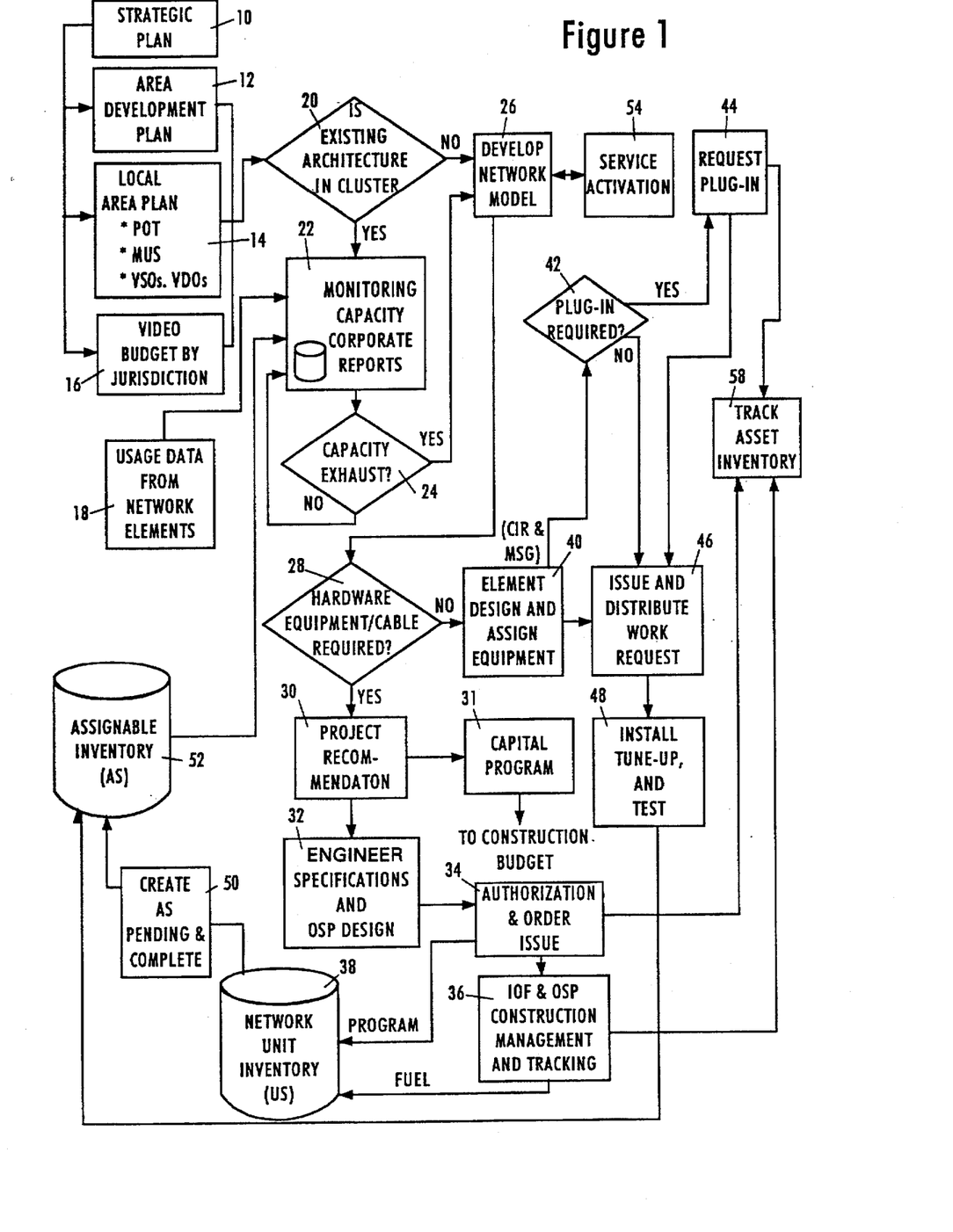
FIG. 1 is a flow chart illustrating a capacity creation process for a broadband network according to a preferred embodiment of the present invention.

FIG. 1 is a flow chart illustrating the broadband network transport capacity creation process according to a preferred embodiment of the present invention. The process shown in FIG. 1 is performed by the computer systems and application modules of the OSS shown with reference to FIG. 2, discussed in detail below.

The process shown in FIG. 1 provides the planning, design, and installation of equipment and construction of facilities that provide assignable inventory for service activation of products and services. This includes defining and implementing the operations systems that support these processes.

As shown in FIG. 1, the first part of the process of network capacity creation involves capacity planning, which includes step 10, step 12, step 14 and step 16. In step 10, a strategic plan is developed and established for providing broadband transport services. The strategic plan developed in step 10 is developed, for example, on the basis of market surveys and business forecasts, and provides an estimate of the demand for broadband transport services in the long term, for example, 5–10 or 10–20 years. The strategic plan will have demand forecasts for both residential and business use, and should also include an evaluation of different proposed transport technologies on the basis of existing infrastructure, costs, and technological feasibility.

The information from step 10 is supplied to step 12, which provides for the development and establishment of an area deployment plan for identifying desired deployment regions. For example, during step 12 certain geographic areas are identified as areas having desirable market potential and a sufficient concentration of potential customers (subscribers) in accordance with the strategic plan in step 10. Each of the geographic areas may cover, for example, a large metropolitan area, such as Philadelphia, Washington, D.C./Baltimore corridor, New York City, etc. The area deployment plan developed in step 12 will also include a network design including a planning design and initial architecture consistent with the forecast demand, population density, available technology and cost limitations.

As an example, the area deployment plan may establish for a specific desired deployment region a plan that specifies a proposed layout assuming a complete installed infrastructure resulting from a 100% build. Thus, the area deployment plan for the specified area would include a deployment scenario using, for example, a hybrid-fiber coax technology, whereby each video end office serves 60 optical nodes, such that the end office serves a total of 30,000 coaxial lines with 500 coaxial lines per optical node. For each of the coaxial lines of the hybrid-fiber coax scenario, each coaxial line would pass 500 living units; of those 500 living units, a take rate of 33% might be forecast, so that approximately 165 subscribers would be anticipated for each coaxial line. For each of the subscribers, the area deployment plan may forecast that 60% of the subscribers would use IMTV services on the broadband network, and 25% of the subscribers would have coincidental use, whereby a subscriber may desire more than one service at a time (for example, switching between IMTV and pay-per-view broadcast simultaneously). Finally, the area deployment plan scenario may estimate that a subscriber may use on average 1.6 set tops, also referred to as digital entertainment terminals, per household.

In addition, the area deployment plan scenario may include forecast user statistics for IMTV sessions. In one example of such a forecast, it may be anticipated that each subscriber to IMTV services will order 40 IMTV sessions per month, with 70% of the sessions being at a transmission rate of 1.5 megabits per second (Mb/s), and 30% at 3.0 Mb/s. In addition, the area deployment plan scenario may allocate bandwidth for a serving end office so that three RF channels are reserved for IMTV services, resulting in a total of 81 Mb/s bandwidth (assuming 27 Mb/s per RF channel in the hybrid-fiber-coax type network).

Thus, the area deployment plan developed in step 12 includes a deployment scenario developed using capacity and traffic management planning to estimate a forecasted demand for service in accordance with the strategic plan of step 12. The area deployment plan in step 12 and the strategic plan of step 10 are supplied to a local area planning step 14, which establishes an area layout specifying locations of network equipment in accordance with the area deployment plan established in step 12. For example, the local area plan in step 14 would determine the location of the actual point of interconnect (POI) from a subscribing video information provider (VIP) into the broadband network, the location of hub end offices, video serving offices (VSO's) and video distribution offices (VDO's). Thus, the local area plan established in step 14 is a more specific plan of the area deployment plan established in step 12, and identifies the location of network equipment, as well as the corresponding distribution capacity for the desired architecture. Although the exemplary deployment scenario uses hybrid-fiber coax technology, alternate local access technology may be used, including fiber to the curb, fiber to the home, or wireless.

After the local area plan is established in step 14, the network creation process in step 16 prepares a video capacity budget that identifies the broadband transport capacity of the network architecture specified in the local area plan. The video budget also compares the forecasted network capacity of the network specified in the local area plan with the forecasted demand for service as specified in the strategic plan developed in step 10. Thus, the video budget established in step 16 identifies the forecasted network capacity with the forecasted demand for service, thereby indicating a surplus of broadband capacity or a need for additional capacity.

If an existing network is installed and in use, traffic and broadband capacity utilization information can be obtained from the network elements in the form of usage data in step 18. The usage data from step 18 is used to monitor the capacity of the existing network system, as described in detail below.

After the capacity planning stage of the process, the network creation process continues with the capacity management portion of the process, which determines whether hardware installation is required to satisfy capacity requests. After the area deployment plan, the local area plan, and the video budget have been established in steps 12, 14 and 16, respectively, it is determined in step 20 whether there exists an existing architecture in the area cluster. If there exists already a broadband network architecture, the process proceeds to step 22 to monitor the capacity of the existing network. The monitoring process in step 22 regularly generates corporate reports that compare traffic statistics from the usage data in step 18 with the available network capacity from assignable inventory, discussed in detail below.

After comparing the usage data with the available network capacity, the process in step 24 determines whether the network capacity has been exhausted. If in step 24 it is determined that there is no exhaustion of capacity, the process returns to step 22 for monitoring. It will be noted that capacity exhaust in step 24 may be dependent upon a variety of factors, including the platform capacity, cable facilities, bandwidth, when equipment is scheduled for maintenance or replacement, or if there is a sudden loss of capacity due to equipment failure or damage due to environmental conditions (lightning, heavy snow, earthquake, etc.). If in step 24 it is determined that the network capacity is exhausted, the process continues to step 26, whereby a network model is developed to accommodate the request for capacity.

Similarly, the capacity implementation process of the present invention determines in step 20 whether there currently exists an architecture for the forecast and specifications established in steps 12, 14 and 16. If there is no existing architecture, i.e., the design is for a new network to be built, the process goes to step 26 to develop a network model. During step 26, the network model development determines the hardware needed to reconcile the request for capacity. In the case of a new network where there is no existing architecture, the network model development in step 26 would include a full and complete design of the network layout, consistent with the local area plan and the video budget, to install the network equipment and facilities from the network POI interfacing a VIP head-end to the local tap passing the homes. In other words, the network model development 26 should include specifications for the specific hardware, geographic location, and port assignments for installation to the network. Thus, steps 20, 22, 24 and 26 form the capacity management portion of the network creation process.

If network model development results in installation of equipment for a dedicated service, the service may be activated in step 54 (discussed in detail below).

After capacity management has been performed, the next stage of the network creation process is capacity implementation. During capacity implementation, the process checks in step 28 whether hardwire equipment or cable is required to implement the network model developed in step 26. If hardwire equipment or cable is required, a project recommendation is prepared in step 30 to order installation. The project recommendation developed in step 30 will typically include an estimate of capital expenditures necessary for completion of the project, which is allocated in step 31 as part of a capital program and directed to construction budget for the project. The project recommendation established in step 30 will then be initiated in step 32 by the engineering of specifications of the specific hardware to be installed. As discussed below with respect to Figure 2, various computer systems may be used during the engineering operations to establish the specifications in step 30. One exemplary system is Object Services Platform, developed by Teknekron Communications Systems, Inc., Berkeley, Calif.

After the actual design work is completed in step 32, the next capacity implementation step of the network capacity creation process in step 34 is to receive authorization to order the equipment needed from a vendor, and to issue the order to the vendor. The order issued in step 34 is tracked in step 36 for interoffice facilities (IOF) using outside plant (OSP) construction management and tracking, which includes the procedures associated with generating a request for quotation (RFQ), selecting a vendor, purchasing the equipment, and managing the physical installation.

After the order is issued in step 34, the copy of the order is sent to a network unit inventory in step 38 that keeps track of equipment under construction and available equipment. Thus, during the step 36, the equipment is identified in step 38 as pending equipment, whereas after completion of step 36, the equipment designation is changed in step 38 to available equipment. In addition, steps 34 and 36 generate similar messages to track asset inventory in step 58, whereby network assets are tracked for financial purposes as receivable assets during the construction phase, and then as equipment assets after completion of the construction in step 36. Therefore, the above-described procedure of the capacity implementation portion of the network creation process involves construction and implementation of network assets in order to obtain an inventory of assets available for use.

Similarly, capacity implementation may involve designing and assigning equipment without need for construction. For example, unused or under-utilized office equipment may be reallocated to solve new capacity requirements. In such a case, as shown in step 28, if no hardwire equipment or cable is required, the process proceeds to step 40, whereby equipment design is performed on an element-by-element level, and equipment is assigned to a particular function. Thus, the network elements are linked together to form a logical connection for use in the assignable inventory.

If a plug-in of network equipment is required in step 42, for example a plug-in of a network card at a network office, a request for plug-in is made in step 44, and the new equipment plug-in is supplied to track asset inventory. In addition, after the request for plug-in in step 44, the process issues and distributes a work request in step 46 in order to request that work be done by service personnel. The requested work is performed in step 48, and after turn-up and test of the equipment in step 48, the equipment is considered ready for use as assignable inventory at step 52. In addition, the network unit inventory is updated in step 48 indicating that the network assets selected in step 40 are assigned to a logical connection as assignable inventory.

Thus, the capacity implementation function includes the steps of generating equipment to satisfy the requirements of the network model developed in step 26. If hardwire equipment or cable is required, the capacity creation process generates the necessary work orders and monitors construction of the equipment into network unit inventory. If, however, no construction is necessary, the capacity implementation portion of the process logically assigns the equipment, tests the equipment, and outputs the logical assignment for storage as assignable inventory.

As shown in FIG. 1, the capacity activation portion of the network creation process includes the step of creating assignable inventory (pending and complete) in step 50, and maintaining the assignable inventory in step 52. In step 50, the available network unit inventory established in step 38 is compiled to provide logical path connections of network elements. During the logical assignment process in step 50, the network elements in the network unit inventory maintained in step 38 may be installed and tested, during which time the assignable inventory is identified as pending. After completion of all installation and testing, the logical assignment in step 50 designates the logical connection as complete and supplies the completed logical connection to a database system, which logs the logical connection as assignable inventory in step 52.

Step 52 maintains the assignable inventory representing the available network capacity for use for service activation. The assignable inventory may be generated either from new equipment via step 50, or by a connection of existing equipment from step 48. The assignable inventory status is provided to step 22 in order to continue monitoring of the network capacity. The assignable inventory 52 may also be adjusted based upon service activation, or service assurance, whereby maintenance or repair may change the inventory status generated in step 52.

Thus, the present invention provides a method as shown in FIG. 1 for creating assignable inventory representing available capacity for use in the network. As will be appreciated by those skilled in the art, the steps of the disclosed process may occur at different times, or simultaneously. For example, during the development of the network model in step 26, part of the network development may involve immediate activation of service in step 54, for example for a new video information provider.

In addition, service activation and service assurance processes are also an integral part of the network management. For example, service activation involves negotiation, assignment, and completion of services, both static and dynamic, for network customers. Service activation and control would include a negotiation of the description, availability, and price of services resulting in a customer service contract/request, as well as an establishment of a customer account profile. Thereafter, service activation would involve selecting a transport path based on the network configuration and assignable inventory maintained in step 52 of FIG. 1 to satisfy the service requirements in the service contract. Thereafter, instructions would be formulated and transmitted to various network elements and work groups to satisfy the requirements in the service contract, after which completion and verification of the work instructions, including updating databases such as the assignable inventory database and the customer account profile, would be completed. Thus, as service is activated, the assignable inventory maintained in step 52 would be updated in view of allocation for activated service. Similarly, updates would occur to be consistent with service assurance procedures. A more detailed description of the techniques and systems for activating and creating service for video information providers and video information users on a broadband network are disclosed in commonly-assigned copending application Ser. No. 08/441,590, filed May 16, 1995, entitled "Operation Support System for Service Creation and Network Provisioning for Video Dial Tone Networks" (Attorney Docket No. 680-118), the disclosure of which is incorporated herein in its entirety by reference.

Figure 2:
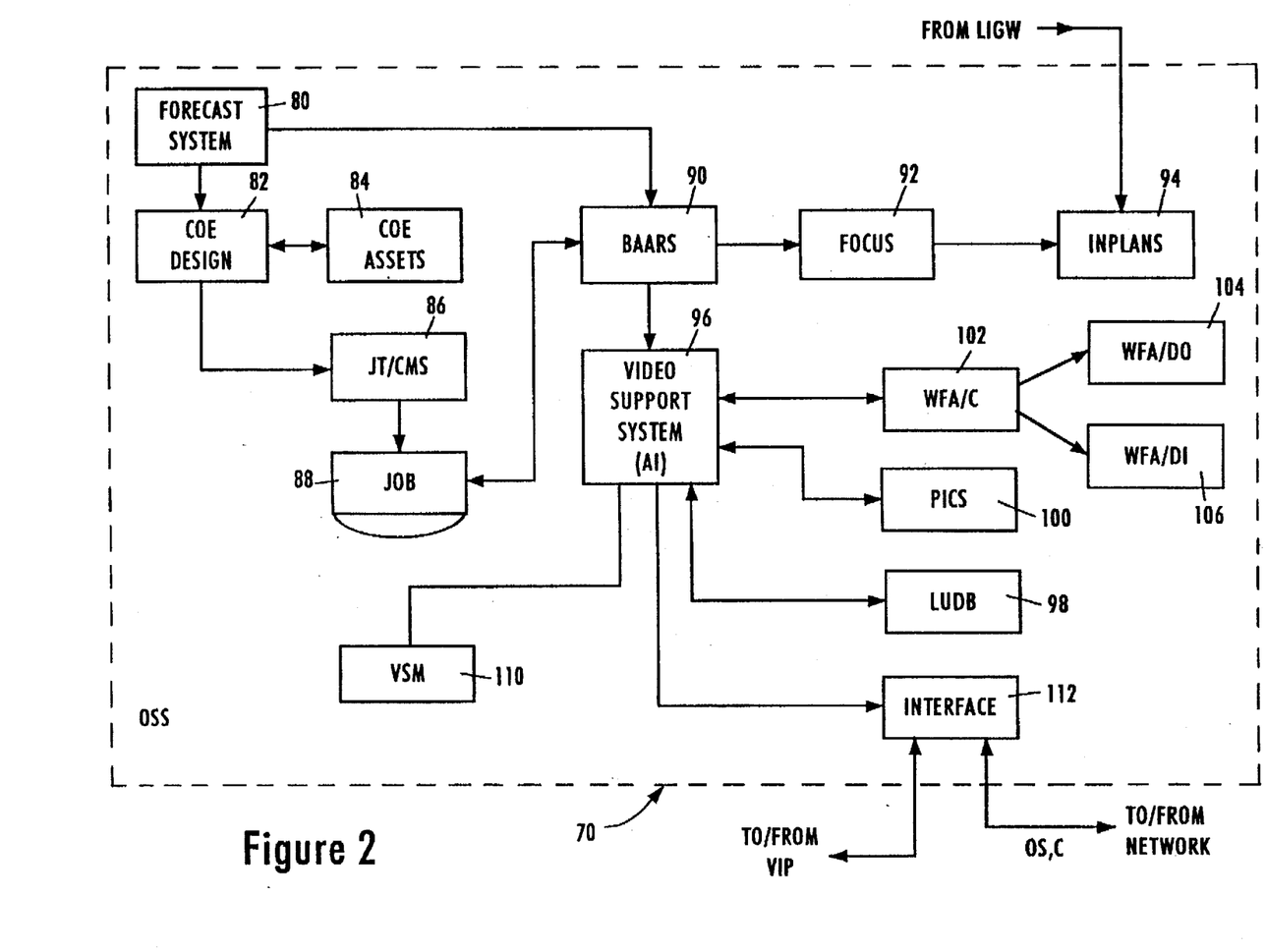
FIG. 2 is a block diagram of a system for creating network transport capacity according to the preferred embodiment of the present invention.

FIG. 2 discloses an exemplary arrangement of an operation support system that performs the process of network capacity creation according to the preferred embodiment of the present invention. The disclosed operational support system (OSS) in FIG. 2 will typically include additional systems related to service assurance, telephony service activation and service, etc.

As shown in FIG. 2, the OSS 70 comprises a forecast system 80 that includes business planning and forecasting systems for performing steps 10, 12, 14 and 16 as discussed above with respect to FIG. 1. The forecast information generated by steps 10, 12, 14 and 16 in FIG. 1 may be a combination of manual entry and computer models, or may be an entire computer-controlled business forecasting system. The forecasting system 80 outputs forecasting and marketing data to a central office equipment (COE) design system 82. From the perspective of the broadband network such as video dial tone, the COE design system 82 includes design modules for computer aided design of the equipment associated with the network elements, including, but not limited to, the control subnetwork, the backbone subnetwork, the broadcast subnetwork, and the office equipment of the access subnetwork (described in detail below). Thus, the COE design system 82 is used in part for network model development as performed in step 26 of FIG. 1. The COE design system 82 outputs equipment lists to a COE assets inventory system 84 that keeps track of hardwire assets in the broadband network, including network unit inventory for COE equipment as shown in step 38. The COE assets inventory system 84 may include known inventory tracking systems, such as INFOBANK and BARETS, both of which are used to track and maintain inventory of central office equipment, including the network elements and their associated equipment.

The COE design system 82 outputs detailed pricing information to a job tracking/capital management system (JT/CMS) 86, which is responsible for order generation and construction tracking of central office equipment, corresponding to steps 34 and 36 of FIG. 1. For example, whenever there exists a capital requirement, for example during development of the network, there is a need to track the capital equipment associated with a construction job. The components of the capital requirement are identified at the time the job is initiated, and the parts are tracked until completion, at which point the components of the capital requirement are tagged as assets. Thus, the JT/CMS 86 outputs and updates the detailed job and capital information to a job database 88, which stores the list of capital equipment and the status of the equipment, for example whether the capital equipment is on order, under construction, or completed as a capital asset.

As discussed above, the foregoing COE design system 82, the COE assets inventory system 84 and the JT/CMS 86 are used for the creation of equipment associated with the components of the network elements, referred to generally as office equipment. A separate system is set up for tracking and maintaining the capital jobs for outside plant equipment corresponding to the local loop of the access subnetwork, which typically include the local loop distribution network including optical fibers, optical to electrical converters, and coaxial cable plant to pass by living units. A more detailed description of a local loop distribution network for a broadband network providing video dial tone services is found in commonly-assigned copending application Ser. No. 08/413,215, filed Mar. 28, 1995, entitled FULL SERVICE NETWORK HAVING DISTRIBUTED ARCHITECTURE (Attorney Docket No. 680-122), the disclosure of which is incorporated in its entirety by reference.

An exemplary tracking system for the local loop distribution network is the Bell Atlantic Automatic Record System (BAARS) 90. The BAARS system 90 performs the job tracking and capital management functions, from an outside plant perspective, whereby capital jobs for the local loop distribution network are tracked from initiation to completion, during which time the assets in the jobs database 88 are updated.

The BAARS system 90 comprises a facilities database in the form of a strand map that provides a graphical representation of the facilities installed in a geographical area, including telephone poles, cable, conduits, etc. As shown in FIG. 2, the BAARS system 90 receives forecasting and marketing data from the forecast system 80. If hardwire equipment or cable is required for the local loop distribution, as indicated in step 28 of FIG. 1, the BAARS system 90 interacts with a FOCUS design system 92, which is an RF design tool for layout design of the coaxial cable systems of the local loop distribution. For example, if it is determined that additional RF facilities are needed, the BAARS system 90 provides the digitized strand map to the FOCUS design system 92. Upon completion of the RF design, the FOCUS design system 92 returns the digitized map to the BAARS system 90, along with an overlay of the RF design layout. Thus, the FOCUS design system supplements the cabling designs of the BAARS system 90, including the location of coaxial cable, corresponding amplifiers, etc. At the same time, the FOCUS design system 92 provides network threshold information to an integrated planning and analysis system (INPLANS) 94, which monitors the capacity based on usage data from the Level 1 Gateway, as shown in step 22 of FIG. 1. The INPLANS system 94 thus is able to monitor existing capacity, as well as project economic evaluations of the network in accordance with the threshold values provided by the FOCUS design system 92. Thus, if the INPLANS system 94 determines that a capacity exhaust situation is about to occur in the near future, the INPLANS system 94 provides the appropriate message to the BAARS system 90 and/or the COE design system 82 in order to perform network model development, corresponding to step 26 of FIG. 1.

Thus, the COE design system 82 and the BAARS system 90 include the network unit inventory of available equipment in accordance with the specified network architecture. Although FIG. 2 discloses the network element (COE) design functionality separate from the local loop distribution functionality, one having ordinary skill in the art will recognize that the two systems may be integrated to form a single design and tracking system, for example, providing the BAARS system 90 with an additional module capable of handling design and tracking of COE related to the network components. In addition, the BAARS system 90 may be adapted with different modules depending on different architectures or local access technologies, including wireless distribution. An example of such a wireless video distribution system is disclosed in commonly-assigned, copending application Ser. No. 08/405,588, filed Mar. 16, 1995 (Attorney Docket No. 680-130), the disclosure of which is incorporated herein in its entirely by reference.

After the COE and local loop assets have been built and identified as available for use in the BAARS database 90, corresponding to the step 38 of FIG. 1, the database information of a BAARS database 90 is supplied to a video support system 96 that includes the assignable inventory database functions corresponding to step 52 in FIG. 1. The video support system 96 logically configures the network components to provide virtual paths that are available for video information providers and video information users to connect to the network. The logical connections are stored in the assignable inventory database (AI) in the video support system 96. If necessary, the video support system 96 accesses a living unit database (LUDB) 98 that includes all information on homes passed. For example, during installation or activation of a video information user, if there is a wiring limit or a distance limitation between a tap on the coaxial cable passing the home and the subscribers living unit, the video support system 96 accesses the LUDB 98 to determine whether an existing tap may be used, and whether a cable drop to the living unit is necessary. Thus, the LUDB 98 will include all information relating to the subscribers home, including whether or not a drop cable is installed at the premises. The term "home passed" is defined as a cable location relative to a living unit, whereby service may be provided within five days.

In addition, the video support system 96 includes operational systems such as the Object Services Platform, described above with respect to step 32 of FIG. 1, in order to perform any necessary engineering operations. The video support system 96 also will determine whether plug-in equipment is necessary at a network office, as shown in step 42 in FIG. 1. If a plug-in is required, the video support system 96 accesses a plug-in inventory control system (PICS) 100. Existing PICS systems are known in the art.

In addition, if manual work or testing is required, the video support system 96 outputs a planning message to a work and force administration/control (WFA/C) system 102. The WFA/C 102 determines whether the work order is for outside plant, or for internal office equipment. If the work order is for outside work, the WFA/C 102 supplies the message to a work and force administration/dispatch out (WFA/DO) system 104, which makes the final determination as to whether a dispatch or testing is required. If, however, inside work is required, the WFA/C 102 outputs the message to the work and force administration/dispatch in (WFA/DI) system 106. Upon completion of the work orders, the appropriate WFA system returns a message to the video support system 96 which updates the assignable inventory database accordingly.

Thus, once the assignable inventory database has been established by the video support system 96, the network is ready to provide transport capacity for activation of new subscribers. In addition, the video support system monitors the assignable inventory based on new work orders, and service assurance.

The OSS 70 also includes an interface 112 for communication between the OSS and the network or sources outside the network, such as an information provider. Specifically, the interface 112 provides control signal paths (C) and operational support interface paths (OS) to network components in order to provide any configuration and/or assignment information, described in detail below with respect to FIG. 3. In addition, the interface 112 enables remote service activation by an information provider, described in detail below with respect to the OS-4 path in FIG. 3.

The OSS 70 may optionally include a video service module 110 that accesses the assignable inventory in the video support system 96 in order to activate a new subscriber in response to a service request. In other words, the VSM 110 accesses the video support system 96 in order to obtain a virtual path for a new subscriber or an existing subscriber requesting additional service. The video support system 96 returns the logical path connection information to the VSM 110, and the video support system 96 updates the assignable inventory 42 in view of the new subscriber allocation of transport capacity. If desirable, the functions of the VSM 110 may also be shared with the Level 1 Gateway. A more detailed description of service activation is found in the commonly-assigned copending application Ser. No. 08/441, 590, filed May 16, 1995, (Attorney Docket No. 680-118) the disclosure of which is incorporated herein in its entirety by reference.

Figure 3:
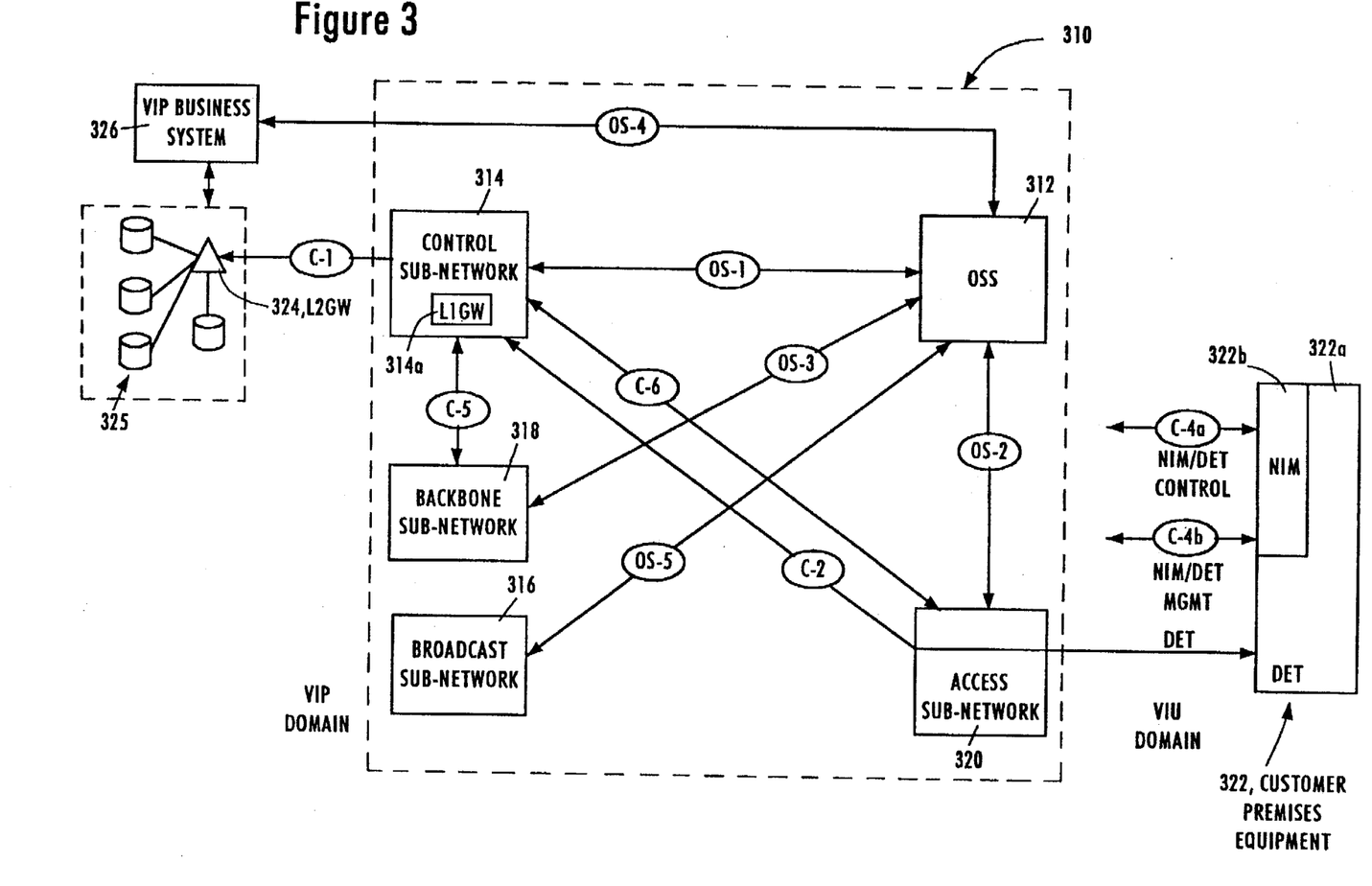
FIG. 3 is a conceptual block diagram of a broadband network architecture for providing broadband data from a plurality of video information providers to at least one video information user.

FIG. 3 depicts a conceptual block diagram of a broadband network, referred to as a Video Dial Tone Network, designed to provide broadcast and interactive broadband data to a plurality of subscribers using at least one of a plurality of access technologies.

The video dial tone network of FIG. 3 provides broadcast and interactive broadband services from a plurality of video information providers (VIPs) to a plurality of video information users (VIUs). As shown in FIG. 3, the video dial tone network 310 includes an operational support system (OSS) 312, a control subnetwork 314, and three transport subnetworks, namely, a broadcast subnetwork 316, a backbone subnetwork 318, and an access subnetwork 320. The broadcast subnetwork 316 receives broadcast signals from different broadcast sources and distributes the received signals to the access subnetwork 320 for transport to video information users. The backbone subnetwork 318, preferably an ATM switch network and also referred to as an ATM subnetwork or interactive subnetwork, provides point-to-point connectivity for interactive services. Thus, the backbone subnetwork 318 provides two-way communications between IMTV service VIPs and nodes of the access subnetwork 320. The access subnetwork 320 provides local loop distribution of broadcast signals from the broadcast subnetwork 316 and interactive service signals from the backbone subnetwork 318. Thus, the access subnetwork 320 distributes broadcast programming to customer premises devices 322 and dynamically provides transport for interactive service related signals to and from the customer premises devices 322. The control subnetwork 314, which comprises a Level 1 Gateway 314a, preferably conducts signaling communications with the customer premises devices 322, a Level 2 Gateway 324 (L2GW) serving a plurality of VIPs 325, and one or more controllers of the subnetworks through the backbone subnetwork.

The disclosed network preferably utilizes asynchronous transfer mode (ATM) transport in the backbone subnetwork 318 and the broadcast subnetwork 316 and RF transport technology for local loop distribution to the subscriber's terminal through the access subnetwork. The functionality provided by the operational support system, however, applies to other broadband networks using other transport technologies in the various access subnetworks. FIG. 3 thus provides a generic illustration of the video dial tone (VDT) transport network 310.

As discussed above with respect to FIG. 2, the operational support system (OSS) 312 is responsible for creating network transport capacity for the video dial tone network 310. Thus, the OSS is responsible for initial planning, design, implementation, testing, and assurance of the components of the network, including the hardwire and equipment of the control subnetwork 314, the broadcast subnetwork 316, the backbone subnetwork 318, and the access subnetwork 320, as well as the associated control signal (C) and operational support (OS) interface paths. In addition, the OSS 312 may be responsible for all service creation and activation for network services based upon the inventory of available facilities and office equipment (OE) for network use. For example, during service activation, the video support system 96 assigns a part of the assignable inventory developed during network transport capacity creation as equipment and/or facilities assigned to a requesting VIP or VIU. The video support system 96 supplies the assignment information to the Level 1 Gateway 314a, and sends configuration information to an Access Subnetwork Controller (ASNC) within the access subnetwork 320 in order to establish a communication path through the video dial tone network.

As discussed above with respect to the OSS interface 112, the OSS 312 supplies assignment information throughout the network 310 via operational support (OS) interface paths. For example, the OSS 312 supplies assignment information to the Level 1 Gateway 314a in the control subnetwork 314 via an OS-1 interface path. The ASNC within the access subnetwork 320 receives facilities and routing information from the OSS 312 via an OS-2 interface path. Similarly, the OSS 312 supplies assignment information for assigned virtual paths for IMTV communications to a controller of the backbone subnetwork 318 via an OS-3 interface path. Finally, the broadcast subnetwork receives assignment information from the OSS 312 via an OS-5 interface path.

In addition, the OSS 312 is adapted to communicate with VIPs via an open interface platform, disclosed in FIG. 3 as an OS-4 interface path. As shown in FIG. 3, a VIP business system 26 is adapted to communicate with the OSS 312 via the OS-4 signal path in order to automatically order changes in the VIPs services. As discussed in detail below, the VIP business system 26 is able to remotely modify its corresponding VIP profile to accommodate changes in transport requirements, such as increased capacity, etc., or to perform event scheduling for upcoming pay-per-view, staggercast, or IMTV events.

Certain digital program signals carried on the network may be encrypted in the access subnetwork, using encryption technology and key codes. Details of specific encryption algorithms and the key codes for encrypting and decrypting the signals are well known to those skilled in the art and familiar with the relevant patents and literature. Preferred procedures for downloading the key codes to the elements in the access subnetwork which encrypt the signals and the decoders in the customer premises equipment (CPE) devices will be discussed later as they relate to aspects of service assignment and/or activation.

The control subnetwork 314 preferably includes a Level 1 Gateway 314a and means for storing a variety of information relating to services provided through the network, VIPs and VIUs for use by the Level 1 Gateway 314a, either in a separate data storage system, or in storage within the computer system serving as the Level 1 Gateway 314a. The backbone subnetwork 318 and the access subnetwork 320 each preferably include a controller which is the single point of control contact between the Level 1 Gateway 314a and the respective subnetwork. Thus, the backbone subnetwork 318 includes a backbone controller, and the access subnetwork includes an access controller (not shown).

As shown in FIG. 3, the control subnetwork 314 communicates with the Level 2 Gateway (L2GW) 324 and the main portion 322a of the DET via the control signal interface paths C-1 and C-2, respectively. Similarly, the control subnetwork communicates with the backbone subnetwork 318 and the access subnetwork via the control signal interface paths C-5 and C-6, respectively.

An example of a simple access subnetwork is found in the network embodiment shown in FIG. 4 of commonly assigned, copending patent application Ser. No. 08/304,174 filed Sept. 12, 1994, incorporated herein by reference, whereby the loop distribution interface and associated hybrid-fiber-coax distribution system constituted an access subnetwork. A control element there identified as a video manager served as the access subnetwork controller. The backbone network included the ATM switch, and the backbone subnetwork controller was the permanent virtual circuit (PVC) controller. An alternative hybrid-fiber-coax distribution system is disclosed in commonly-assigned, copending application Ser. No. 08/413,215, filed Mar. 28, 1995, entitled FULL SERVICE NETWORK HAVING DISTRIBUTED ARCHITECTURE (Attorney Docket No. 680-122), the disclosure of which is incorporated herein in its entirety by reference. Other local access technologies may be substituted, such as fiber to the curb, or wireless. Exemplary fiber-to-the-curb architectures are disclosed in commonly-assigned, copending applications Ser. No. 08/380,744, now U.S. Pat. No. 5,583,863, filed Jan. 31, 1995 (Attorney Docket No. 680-109), and Ser. No. 08/380,758, filed Jan. 31, 1995 (Attorney Docket No. 680-123), the disclosures both of which are incorporated in their entirety by reference. Exemplary wireless system are shown in co-pending application Ser. No. 08/405,558, filed Mar. 16, 1995, entitled "SIMULTANEOUS OVERLAPPING BROADCASTING OF DIGITAL PROGRAMS" (Attorney Docket No. 680-130), the disclosure of which is hereby incorporated in its entirety by reference. Other types of access subnetworks, broadcast subnetworks, backbone subnetworks and subnetwork controllers may be used to construct the video dial tone network interfaced to the OSS in accord with the present invention.

In the network illustrated in FIG. 3, a number of broadcast video information providers (VIPs) may operate one or more broadcast sources that have a one-way connection (downstream) to the broadcast subnetwork 316. The broadcast signals may be analog or digital or a combination of both, as discussed below. In the preferred embodiment, each digital source supplies a number of broadcast programs to the broadcast subnetwork 316, preferably in ATM cell form.

A source will supply the program signals, e.g. ATM cells containing digitized broadcast information for a broadcast service, to the network 310 at all times that the service is to be available through the network. For video services, for example, the original source video material is digitally encoded and compressed, and the digital video information is packetized in ATM cells for transport through the network 310. The ATM cells can represent service signals for broadband services (e.g. video), audio services (e.g. radio) or data services (e.g. text).

In the preferred embodiment, the VIU's customer premises equipment (CPE) 322 includes a Digital Entertainment Terminal (DET) 322a which includes a network interface module (NIM) 322b adapted to connect the DET to the specific type of loop distribution plant servicing the subscriber's premises. For broadcast services, the DET 322a typically is able to select and process any digital or analog channel broadcast through the access subnetwork 320 to which the customer subscribes. The DET 322a is adapted to receive selected control signals received by the access subnetwork 320 via the control signal interface path C-2. The control subnetwork 314 also communicates NIM/DET control signals and NIM/DET management signals to the CPE 322 via control signal interface paths C-4a and C-4b, respectively.

For example, for premium services requiring some form of network connection control, e.g. on-line selection of a pay-per-view event, the subscriber's terminal or CPE device 322 sends a request signal to the Level 1 Gateway 314a within the control subnetwork 314. In response to the instructions from the Level 1 Gateway 314a, the access controller causes the access subnetwork 320 to supply program signals for the requested broadcast service to the customer's CPE device 322. The routing functionality of the access subnetwork for broadcast services depends on the structure thereof. For example, in the disclosed network, enabling reception of a broadcast program requires identifying the RF channel carrying the program to the DET and supplying certain information needed to decode the program signals to the DET 322a and/or the NIM 322b through the relevant control interface paths. The Level 1 Gateway 314a will store usage data identifying the requested service in its associated database, for billing purposes, for audience surveys, maintenance purposes, etc. and will periodically forward such data through the OS-1 interface path to the OSS 312 for appropriate processing.

For interactive multi-media television (IMTV) type services, the system will include a number of interactive service video information providers (VIPs) operating the plurality of VIP interactive systems 325. Each IMTV VIP operates some form of source or server for transmitting information downstream through the network 310 to a terminal which has requested an interactive session with the particular VIP. Each IMTV VIP also operates a control element, such as the Level 2 Gateway 324, which provides two-way signaling communications to the Level 1 Gateway 314a via control path C-1 and provides two-way signaling communications through the network 310 to the CPE devices 322 corresponding to subscribers who have established interactive sessions with the VIP. The Level 2 Gateway 324 controls operations of the server in response to instructions from the Level 1 Gateway 314a and various information input by subscribers through their respective CPE terminal devices 322.

The signaling communications for the IMTV VIPs may go through a separate signaling network, such as the control path C-1 shown in FIG. 3, or through the backbone subnetwork 318. The IMTV VIPs will typically offer broadband interactive services, such as video on demand, video based home shopping and video games, but these VIPs may offer other interactive services, such as interactive text services and interactive audio services (e.g. voice mail and audio on demand).

To establish a session with one of the interactive VIPs, a user operates his or her terminal device 322 to interact with the Level 1 Gateway 314a to identify the particular VIP of choice. Once the subscriber selects the VIP, the Level 1 Gateway 314a instructs the backbone subnetwork 318 and the access subnetwork 320 to establish at least a broadband downstream link between the VIPs server and the particular subscriber's CPE device 322 and provides any necessary information to the IMTV VIPs equipment.

Once network capacity has been created in accordance with the present invention, the OSS may perform service creation functions including service activation of existing network resources. Service activation of existing video dial tone network services will typically occur in response to a request for new service, whereby a request for new service (new VIP online or new VIU requesting connection to receive services) will be generated from a customer service center that receives the request from the subscriber, for example a VIU calling the customer service center managed by the network 310, or VIP business office 326 calling the customer service center. In the latter case, the VIP business office 326 may be processing a subscription request from a VIU requesting specific VIP services. However, an existing VIP already established on the network 310 may also request new service (new VIU or additional VIP services), for example by online registration via the OS-4 interface shown in FIG. 3.

The service creation function also includes supplying usage information to enable monitoring of network assets. As discussed above with respect to FIG. 1, such monitoring includes comparing existing equipment and facilities to existing and projected service demands to determine if additional capital equipment is necessary. The monitoring of network assets may be affected by, for example, increased usage in specific serving areas, seasonal variations in usage (e.g., increased use in winter), or replacing obsolete equipment.

Thus, the OSS manages service creation functions and monitors capacity by tracking the existing network assets and assignable and available inventory of video dial tone resources to accommodate network service requirements. The OSS performs service activation functions in accordance with the service creation functions in order to implement new service for requesting subscribers. Additional details regarding service creation and activation may be found in commonly-assigned, copending application Ser. No. 08/441,590, filed May 16, 1995, entitled "Operation Support System for Service Creation and Network Provisioning for Video Dial Tone Networks", (Attorney Docket No. 680-118), the disclosure of which is incorporated in its entirety by reference.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for creating network transport capacity for a broadband network, comprising the steps of:

planning transport capacity requirements for a desired deployment region in accordance with a selected broadband network architecture;

implementing said network transport capacity in accordance with said transport capacity requirements to obtain network unit inventory, comprising:

(1) tracking network construction in a job tracking and management system based on the transport capacity requirements, and (2) updating a network unit database to store said network unit inventory based on the network construction, said network unit inventory comprising network assets for use as one of network element equipment and loop distribution facilities; and logically assigning at least a portion of said network assets to logical paths of broadband transport to obtain an assignable inventory identifying said network transport capacity.

2. A method as recited in claim 1, wherein said planning step comprises the steps of:

establishing a strategic plan for providing broadband transport services, said strategic plan comprising a demand forecast for broadband services;

identifying and defining said desired deployment region;

selecting the selected broadband network architecture from a plurality of available network architectures; and determining a capacity budget comparing said demand forecast with a forecasted network capacity of said selected broadband network, said transport capacity requirements being generated in accordance with said capacity budget.

3. A method as recited in claim 2, wherein said selecting step comprises the step of preparing a local area plan for at least one area within said desired deployment region, said local area plan identifying a point of interconnect, and a location of network equipment, for said broadband network.

4. A method as recited in claim 2, wherein said plurality of available network architectures include hybrid-fiber coax, fiber to the home, fiber to the curb, and wireless.

5. A method as recited in claim 2, further comprising the step of developing a network model of the desired deployment region in accordance with said selected broadband network architecture and said capacity budget, said network model comprising network specifications for said implementing step.

6. A method as recited in claim 5, wherein said network specifications identify one of network equipment and network facilities to be built.

7. A method as recited in claim 5, wherein said network specifications identify a network point-of-interconnect for a subscribing information provider, network equipment for the broadband transport, and network facilities.

8. A method as recited in claim 5, further comprising the step of monitoring capacity of existing network elements to determine an occurrence of capacity exhaust, said developing step developing said network model in accordance with said occurrence of capacity exhaust.

9. A method as recited in claim 5, wherein said implementing step comprises the steps of:

generating a project recommendation for said network construction, said project recommendation identifying capital requirements; and engineering network specifications identifying components of said network assets;

wherein said tracking step tracks said network construction of said components in accordance with said capital requirements and said network specifications.

10. A method as recited in claim 9, wherein said implementing step further comprises the steps of:

designing network elements in accordance with said network assets stored in said network unit inventory;

logically assigning selected network assets to said respective designed network elements;

updating said network unit database to identify said selected network assets as assigned network assets.

11. A method, for creating network transport capacity for a broadband network, comprising the steps of:

planning transport capacity requirements for a desired deployment region in accordance with a selected broadband network architecture;

implementing said network transport capacity in accordance with said transport capacity requirements to obtain network unit inventory, said network unit inventory comprising network assets for use as one of network element equipment and loop distribution facilities;

logically assigning at least a portion of said network assets to logical paths of broadband transport to obtain an assignable inventory identifying said network transport capacity, wherein said planning step comprises the steps of:

(1) establishing a strategic plan for providing broadband transport services, said strategic plan comprising a demand forecast for broadband services;

(2) identifying and defining said desired deployment region;

(3) selecting the selected broadband network architecture from a plurality of available network architectures; and (4) determining a capacity budget comparing said demand forecast with a forecasted network capacity of said selected broadband network, said transport capacity requirements being generated in accordance with said capacity budget;

the method further comprising the step of developing a network model of the desired deployment region in accordance with said selected broadband network architecture and said capacity budget, said network model comprising network specifications for said implementing step;

wherein said implementing step comprises the steps of:

(1) generating a project recommendation for network construction, said project recommendation identifying capital requirements, (2) engineering network specifications identifying components of said network assets, (3) tracking said network construction of said components in accordance with said capital requirements and said network specifications, said tracking step updating a network unit database storing said network unit inventory in response to said network construction, (4) designing network elements in accordance with said network assets stored in said network unit inventory, (5) logically assigning selected network assets to said respective designed network elements, (6) updating said network unit database to identify said selected network assets as assigned network assets, and (7) requesting a plug-in of specified network assets for one of said designed network elements, said network unit database being updated to identify completion of said plug-in.

12. A method as recited in claim 11, wherein said implementing step further comprises the step of updating an asset inventory in response to assignment of network assets, respectively.

13. A method as recited in claim 5, wherein said implementing step comprises the steps of:

designing network elements in accordance with said network assets stored in said network unit inventory;

logically assigning selected network assets to said respective designed network elements;

updating said network unit database to identify said selected network assets as assigned network assets.

14. A method for creating network transport capacity for a broadband network, comprising the steps of:

planning transport capacity requirements for a desired deployment region in accordance with a selected broadband network architecture;

implementing said network transport capacity in accordance with said transport capacity requirements to obtain network unit inventory, said network unit inventory comprising network assets for use as one of network element equipment and loop distribution facilities;

logically assigning at least a portion of said network assets to logical paths of broadband transport to obtain an assignable inventory identifying said network transport capacity, wherein said planning step comprises the steps of:

(1) establishing a strategic plan for providing broadband transport services, said strategic plan comprising a demand forecast for broadband services, (2) identifying and defining said desired deployment region, (3) selecting the selected broadband network architecture from a plurality of available network architectures, and (4) determining a capacity budget comparing said demand forecast with a forecasted network capacity of said selected broadband network, said transport capacity requirements being generated in accordance with said capacity budget;

the method further comprising the step of developing a network model of the desired deployment region in accordance with said selected broadband network architecture and said capacity budget, said network model comprising network specifications for said implementing step;

wherein said implementing step comprises the steps of:

(1) designing network elements in accordance with said network assets stored in said network unit inventory, (2) logically assigning select network assets to said respective designed network elements, (3) updating said network unit database to identify said selected network assets as assigned network assets, and (4) requesting a plug-in of specified network assets for one of said designed network elements, said network unit database being updated to identify completion of said plug-in.

15. A method as recited in claim 5, further comprising the step of monitoring capacity of existing network elements and said network transport capacity indicated by said assignable inventory to determine an occurrence of capacity exhaust, said developing step developing said network model in accordance with said occurrence of capacity exhaust.

16. In a broadband digital network support system comprising a network element design system adapted for designing components for use as one of equipment and facilities for a broadband digital network, a job tracking and management system, a first database for tracking network inventory available for use, a second database for tracking assignable inventory available for service creation for network subscribers, and a logical assignment system adapted for logically assigning at least a portion of said network inventory identified in said first database as said assignable inventory in said second database, a method for creating network transport capacity for a broadband digital network, comprising the steps of:

planning transport capacity requirements for a desired deployment region in accordance with a selected broadband network architecture;

developing a broadband network model in said network element design system in accordance with said transport capacity requirements;

tracking network construction in said job tracking and management system in accordance with said network model;

updating said first database with said job tracking and management system in response to said tracking network construction step, said network inventory identified in said first database comprising network assets for use as one of network element equipment and loop distribution plant;

compiling at least a portion of said network inventory with said logical assignment system to obtain a logical path connecting said portion of said network inventory; and storing said logical path obtained by said logical assignment system to said second database, said logical path representing assignable inventory identifying said network transport capacity.

17. A method as recited in claim 16, wherein said planning step comprises the steps of:

establishing a strategic plan for providing broadband transport services, said strategic plan comprising a demand forecast for broadband services;

identifying and defining said desired deployment region;

selecting the selected broadband network architecture from a plurality of available network architectures;

determining a capacity budget comparing said demand forecast with a forecasted network capacity of said selected broadband network architecture, said transport capacity requirements being generated in accordance with said capacity budget.

18. A method as recited in claim 17, wherein said selecting step comprises the step of preparing a local area plan for at least one area within said desired deployment region, said local area plan identifying a point of interconnect, and a location of network equipment, for said broadband digital network.

19. A method as recited in claim 17, wherein said plurality of available network architectures include hybrid-fiber coax, fiber to the home, fiber to the curb, and wireless.

20. A method as recited in claim 16, wherein said broadband digital network support system further comprises an integrated planning system for monitoring network traffic, the method further comprising the steps of:

supplying traffic threshold information from said network element design system to said integrated planning system in accordance with said transport capacity requirements;

retrieving traffic information corresponding to said monitored network traffic from said integrated planning system; and determining an occurrence of capacity exhaust in response to said retrieved traffic information, said developing step developing said network model in accordance with said occurrence of capacity exhaust.

21. In a broadband digital network support system comprising a network element design system adapted for designing components for use as one of equipment and facilities for a broadband digital network, a job tracking and management system, a first database for tracking network inventory available for use, a second database for tracking assignable inventory available for service creation for network subscribers, and a logical assignment system adapted for logically assigning at least a portion of said network inventory identified in said first database as said assignable inventory in said second database, a method for creating network transport capacity for a broadband digital network, comprising the steps of:

planning transport capacity requirements for a desired deployment region in accordance with a selected broadband network architecture;

developing a broadband network model in said network element design system in accordance with said transport capacity requirements;

tracking network construction in said job tracking and management system in accordance with said network model;

updating said first database with said job tracking and management system in response to said tracking network construction step, said network inventory identified in said first database comprising network assets for use as one of network element equipment and loop distribution plant;

compiling at least a portion of said network inventory with said logical assignment system to obtain a logical path connecting said portion of said network inventory; and storing said logical path obtained by said logical assignment system to said second database, said logical path representing assignable inventory identifying said network transport capacity, wherein said broadband digital network support system further comprises a work force administration system, the method further comprising the steps of:

outputting from said logical assignment system a work order request to said work force administration system in accordance with said network model, said network model identifying network facilities to be built; tracking installation of said network facilities with said work force administration system; and updating said second database with said network facilities in response to a work completion message from said work force administration system.

22. In a broadband digital network support system comprising a network element design system adapted for designing components for use as one of equipment and facilities for a broadband digital network, a job tracking and management system, a first database for tracking network inventory available for use, a second database for tracking assignable inventory available for service creation for network subscribers, and a logical assignment system adapted for logically assigning at least a portion of said network inventory identified in said first database as said assignable inventory in said second database, a method for creating network transport capacity for a broadband digital network, comprising the steps of:

planning transport capacity requirements for a desired deployment region in accordance with a selected broadband network architecture;

developing a broadband network model in said network element design system in accordance with said transport capacity requirements;

tracking network construction in said job tracking and management system in accordance with said network model;

updating said first database with said job tracking and management system in response to said tracking network construction step, said network inventory identified in said first database comprising network assets for use as one of network element equipment and loop distribution plant;

compiling at least a portion of said network inventory with said logical assignment system to obtain a logical path connecting said portion of said network inventory; and storing said logical path obtained by said logical assignment system to said second database, said logical path representing assignable inventory identifying said network transport capacity, wherein said broadband digital network support system further comprises a plug-in inventory control system, the method further comprising the steps of:

outputting from said logical assignment system a plug-in request to said plug-in inventory control system in accordance with said network model, said network model identifying network equipment to be installed for network elements;

tracking installation of said network equipment with said plug-in inventory control system; and updating said second database with said network facilities in response to a completion message from said plug-in inventory control system.

* * * * *